(12) United States Patent
Ha et al.

(10) Patent No.: US 11,429,622 B2
(45) Date of Patent: Aug. 30, 2022

(54) METHOD OF SUPPORTING BIG DATA ANALYSIS BASED ON PROVENANCE INFORMATION AND APPARATUSES PERFORMING THE SAME

(71) Applicant: Electronics and Telecommunications Research Institute, Daejeon (KR)

(72) Inventors: Suwook Ha, Daejeon (KR); Kangchan Lee, Daejeon (KR); Min Kyo In, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 556 days.

(21) Appl. No.: 16/459,232

(22) Filed: Jul. 1, 2019

(65) Prior Publication Data
US 2020/0004747 A1 Jan. 2, 2020

(30) Foreign Application Priority Data

Jul. 2, 2018 (KR) .................. 10-2018-0076448
Nov. 27, 2018 (KR) .................. 10-2018-0148993

(51) Int. Cl.
*G06F 16/2458* (2019.01)
*G06N 5/02* (2006.01)
*G06F 9/50* (2006.01)

(52) U.S. Cl.
CPC ........ *G06F 16/2465* (2019.01); *G06F 9/5005* (2013.01); *G06N 5/022* (2013.01)

(58) Field of Classification Search
CPC .......... G06N 20/00; G06N 3/08; G06N 5/022; G06N 3/0472; G06N 7/005; G06Q 10/0633; G06F 16/2465; G06F 9/5005
See application file for complete search history.

(56) References Cited

U.S. PATENT DOCUMENTS

| 2014/0047028 A1* | 2/2014 | Buth .................. G06Q 10/103 709/204 |
| 2014/0236663 A1* | 8/2014 | Smith ............... G06Q 10/0633 705/7.27 |
| 2015/0356485 A1* | 12/2015 | Aggour ........... G06Q 10/06316 705/7.26 |
| 2016/0364211 A1 | 12/2016 | Chau et al. |

(Continued)

FOREIGN PATENT DOCUMENTS

KR 10-2017-0089067 A 8/2017

OTHER PUBLICATIONS

Peter Buneman et al., "Why and Where: A Characterization of Data Provenance", ICDT 2001: Database Theory, pp. 1-15, Oct. 12, 2001.

*Primary Examiner* — Yuk Ting Choi
(74) *Attorney, Agent, or Firm* — Rabin & Berdo, P.C.

(57) ABSTRACT

Disclosed are a provenance information-based bigdata analysis supporting method, and an apparatus performing the bigdata analysis supporting method. The bigdata analysis supporting method includes receiving a request to provide a bigdata analysis method from a bigdata analysis apparatus, reconfiguring a workflow selected from a plurality of workflows corresponding to the bigdata analysis method to be supported by the bigdata analysis apparatus based on analysis resource information of the bigdata analysis apparatus, and transmitting the reconfigured workflow to the bigdata analysis apparatus.

14 Claims, 11 Drawing Sheets

(56) References Cited

U.S. PATENT DOCUMENTS

| | | | | |
|---|---|---|---|---|
| 2017/0091673 A1* | 3/2017 | Gupta | .................... | G06N 20/00 |
| | | | | 709/204 |
| 2017/0221240 A1* | 8/2017 | Stetson | ................. | G06T 11/206 |
| | | | | 709/204 |
| 2017/0351722 A1 | 12/2017 | Ha et al. | | |
| 2019/0182119 A1* | 6/2019 | Ratkovic | ............. | G06F 16/2379 |
| | | | | 709/204 |

\* cited by examiner

METHOD OF SUPPORTING BIG DATA ANALYSIS BASED ON PROVENANCE INFORMATION AND APPARATUSES PERFORMING THE SAME

CROSS-REFERENCE TO RELATED APPLICATION(S)

This application claims the priority benefit of Korean Patent Application No. 10-2018-0076448 filed on Jul. 2, 2018, and Korean Patent Application No. 10-2018-0148993 filed on Nov. 27, 2018, in the Korean Intellectual Property Office, the disclosures of which are incorporated herein by reference for all purposes.

BACKGROUND

1. Field

One or more example embodiments relate to a method of supporting a bigdata analysis using provenance information present inside or outside a system, and an apparatus performing the method.

2. Description of Related Art

A bigdata analysis may require several times of preprocessing and analysis processes for various data resources. A processing method for target data may be more complicated based on a detailed purpose of the analysis and be optimized to an analysis method, and thus a wide use of the data may be reduced.

Provenance information may provide information associated with a processing method and step through history management of data, and enable a user to identify reliability and availability of the data. The provenance information may be used for a bigdata analysis and a data verification.

SUMMARY

An aspect provides technology for reconfiguring an analysis processing step to be supported by a system using data processing steps extracted from provenance information obtained from different systems, and using the reconfigured analysis processing step for a bigdata analysis.

According to an example embodiment, there is provided a bigdata analysis supporting method including receiving a request to provide a bigdata analysis method from a bigdata analysis apparatus, reconfiguring, to be supported by the bigdata analysis apparatus, a workflow selected from a plurality of workflows corresponding to the bigdata analysis method based on analysis resource information of the bigdata analysis apparatus, and transmitting the reconfigured workflow to the bigdata analysis apparatus.

The reconfiguring may include retrieving the plurality of workflows corresponding to the bigdata analysis method based on the analysis resource information.

The retrieving may include retrieving the plurality of workflows satisfying the analysis resource information from a plurality of analysis process graph models.

The reconfiguring may include transforming, into available analysis functions of the bigdata analysis apparatus, analysis functions included in the selected workflow by mapping the analysis functions and a list of the available analysis functions of the bigdata analysis apparatus.

The reconfiguring may include reconfiguring the selected workflow to be supported by the bigdata analysis apparatus using the mapped available analysis functions.

The transforming may include mapping the analysis functions included in the selected workflow respectively to the available analysis functions of the bigdata analysis apparatus, mapping a combination of the analysis functions included in the selected workflow to a single available analysis function of the bigdata analysis apparatus, and mapping a single analysis function included in the selected workflow to a combination of the available analysis functions of the bigdata analysis apparatus.

The analysis resource information may include system configuration information of the bigdata analysis apparatus, a list of the available analysis functions of the bigdata analysis apparatus, and information associated with data to be used for a bigdata analysis.

The plurality of workflows may be operable in the bigdata analysis apparatus.

The plurality of analysis process graph models may be generated by applying a frequency of an analysis function to workflows extracted from sets of provenance information of bigdata analysis apparatuses.

The frequency of the analysis function may include a frequency of use of the analysis function and a frequency of sequential occurrence of the analysis function and a neighboring analysis function of the analysis function.

According to another example embodiment, there is provided a bigdata analysis supporting apparatus including a communication module configured to receive a request to provide a bigdata analysis method from a bigdata analysis apparatus, and a processor configured to execute instructions to generate a workflow for the bigdata analysis method. When the instructions are executed, the processor may reconfigure, to be supported by the bigdata analysis apparatus, a workflow selected from a plurality of workflows corresponding to the bigdata analysis method based on analysis resource information of the bigdata analysis apparatus, and transmit the reconfigured workflow to the bigdata analysis apparatus.

The processor may retrieve the plurality of workflows corresponding to the bigdata analysis method based on the analysis resource information.

The processor may retrieve, from a plurality of analysis process graph models, the plurality of workflows satisfying the analysis resource information.

The processor may transform, into available analysis functions of the bigdata analysis apparatus, analysis functions included in the selected workflow by mapping the analysis functions to a list of the available analysis functions of the bigdata analysis apparatus.

The processor may reconfigure the selected workflow to be supported by the bigdata analysis apparatus using the mapped available analysis functions.

The processor may map the analysis functions included in the selected workflow respectively to the available analysis functions of the bigdata analysis apparatus, map a combination of the analysis functions included in the selected workflow to a single available analysis function of the bigdata analysis apparatus, and map a single analysis function included in the selected workflow to a combination of the available analysis functions of the bigdata analysis apparatus.

The analysis resource information may include system configuration information of the bigdata analysis apparatus, a list of the available analysis functions of the bigdata analysis apparatus, and information associated with data to be used for a bigdata analysis.

The plurality of workflows may be operable in the bigdata analysis apparatus.

The plurality of analysis process graph models is may be generated by applying a frequency of an analysis function to workflows extracted from sets of provenance information of bigdata analysis apparatuses.

The frequency of the analysis function may include a frequency of use of the analysis function, and a frequency of sequential occurrence of the analysis function and a neighboring analysis function of the analysis function.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the present disclosure will become apparent and more readily appreciated from the following description of example embodiments, taken in conjunction with the accompanying drawings of which.

DETAILED DESCRIPTION

Figure 1:
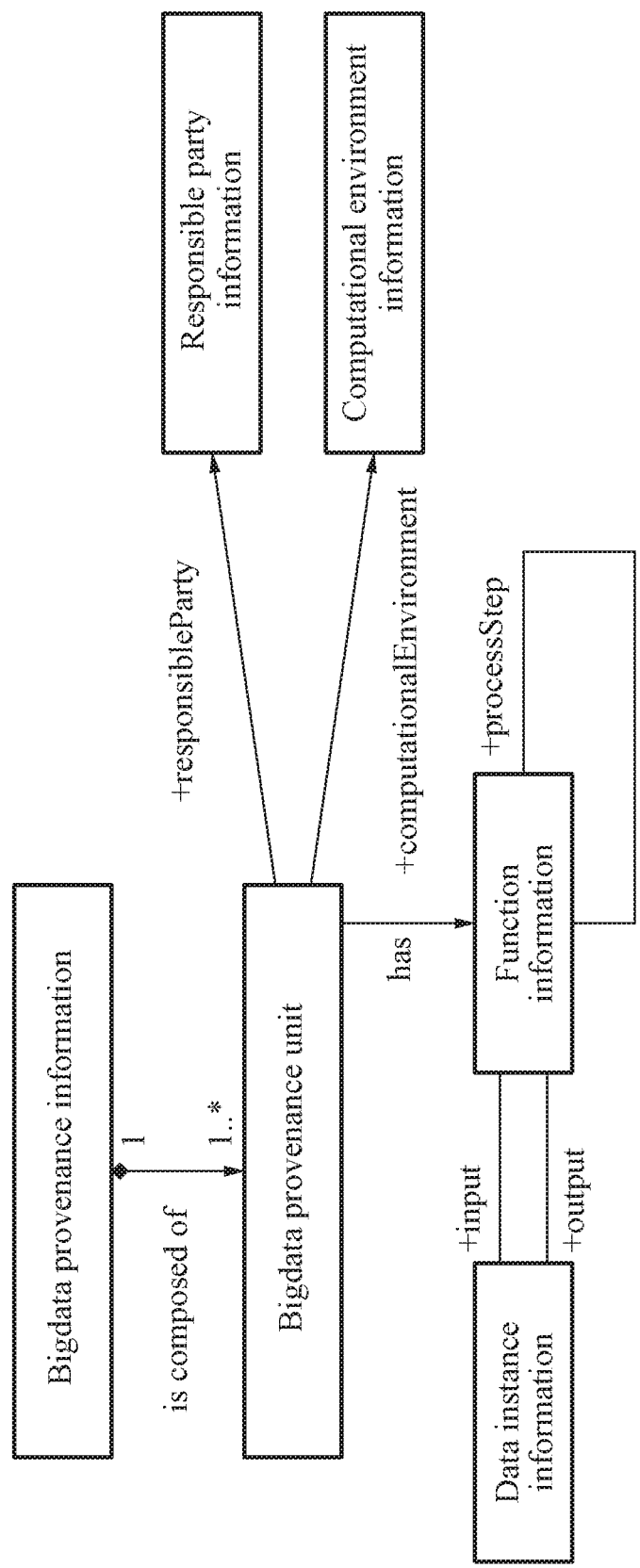
FIG. 1 is a diagram illustrating an example of a concept model of provenance information according to an example embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, operations, elements, and/or components, but do not preclude the presence or addition of one or more other features, integers, operations, elements, components, and/or groups thereof.

Terms such as first, second, A, B, (a), (b), and the like may be used herein to describe components. Each of these terminologies is not used to define an essence, order, or sequence of a corresponding component but used merely to distinguish the corresponding component from other component(s). For example, a first component may be referred to as a second component, and similarly the second component may also be referred to as the first component.

Unless otherwise defined, all terms, including technical and scientific terms, used herein have the same meaning as commonly understood by one of ordinary skill in the art to which this disclosure pertains based on an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings.

The example embodiments to be described hereinafter relate to a system and a method that supports a bigdata analysis using provenance information.

FIG. 1 is a diagram illustrating an example of a concept model of provenance information according to an example embodiment.

Provenance information refers to information provided to a user enabling the user to identify a reliability and an availability of data or bigdata. The provenance information may provide a history of the data. The history of the data may include information associated with methods and steps (or order) of, for example, processing and analyzing the data.

The provenance information may include a plurality of provenance units, for example, a set of provenance units. A provenance unit may record, or store, information associated with a change in data instance that occurs most recently. The provenance unit may be a smallest unit that constitutes the provenance information.

The provenance unit may include data instance information, information on a responsible party corresponding to an owner or a manager of the data, computational environment information that provides information on an environment in which the data is processed, and function information including, for example, a sequence of functions or a processing step. The function information may include a data input and/or output value used for, for example, a data mashup or an analysis process.

Figure 2:
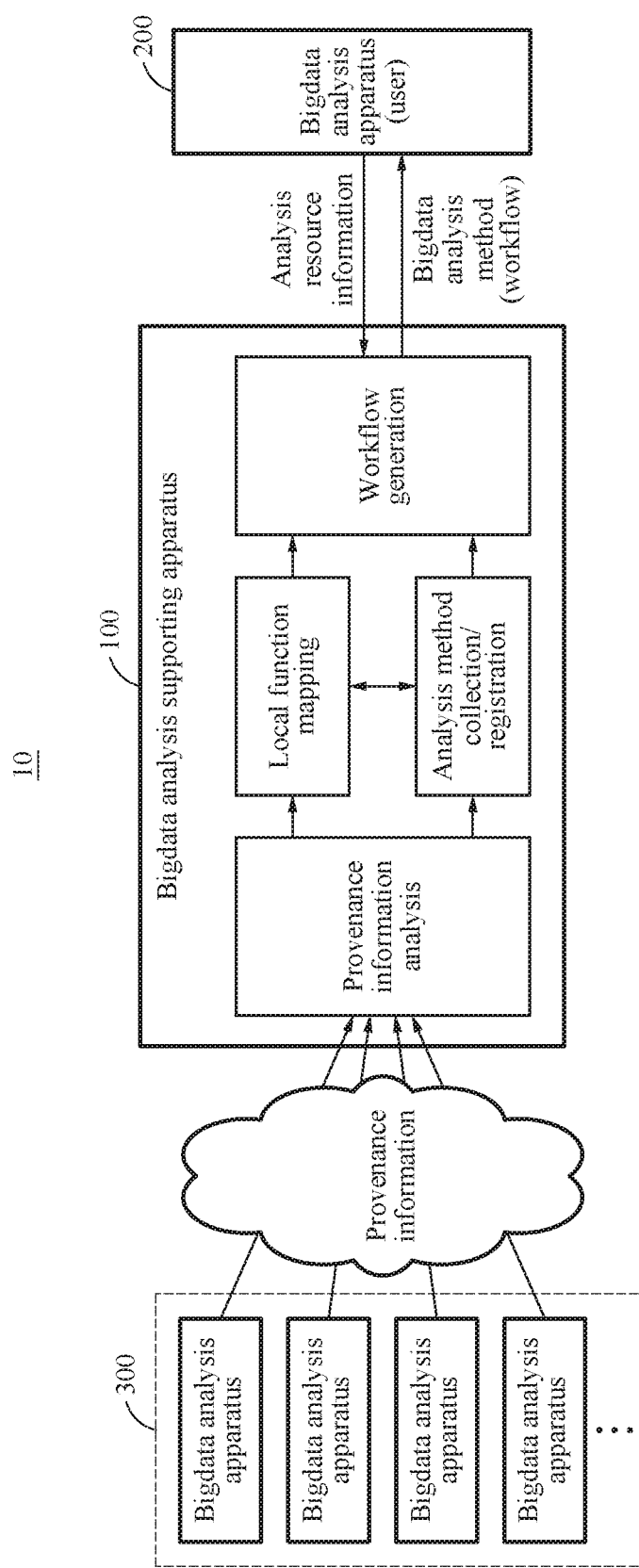
FIG. 2 is a diagram illustrating an example of a service provided by a bigdata service system according to an example embodiment.

FIG. 2 is a diagram illustrating an example of a service provided by a bigdata service system according to an example embodiment.

Referring to FIG. 2, a bigdata service system 10 includes a bigdata analysis supporting apparatus 100, and a plurality of bigdata analysis apparatuses 200 and 300. Each of the bigdata analysis apparatuses 200 and 300 may provide provenance information to the bigdata analysis supporting apparatus 100 and transmit, to the bigdata analysis supporting apparatus 100, a request to provide a bigdata analysis method.

For convenience of description, the bigdata analysis apparatuses 200 and 300 will be classified into a bigdata analysis apparatus 200 and bigdata analysis apparatuses 300. The bigdata analysis apparatus 200 is an apparatus that transmits the request to provide the bigdata analysis method to the bigdata analysis supporting apparatus 100, and the bigdata analysis apparatuses 300 are apparatuses that provide sets of provenance information to the bigdata analysis supporting apparatus 100.

The bigdata analysis supporting apparatus 100 collects the sets of provenance information from the bigdata analysis apparatuses 300, analyzes the collected provenance information, and stores and manages the analyzed provenance information.

The bigdata analysis apparatus 200 transmits the request to provide the bigdata analysis method to the bigdata analysis supporting apparatus 100. When transmitting the request, the bigdata analysis apparatus 200 transmits analysis resource information to the bigdata analysis supporting apparatus 100.

The analysis resource information may be included in the request and provided to the bigdata analysis supporting apparatus 100. The analysis resource information includes, for example, system configuration information of the bigdata analysis apparatus 200, a list of analysis functions of the bigdata analysis apparatus 200, and metadata information associated with data to be used for a bigdata analysis. The system configuration information includes, for example, operating system (OS) information, hardware (HW) information, and setting information of the bigdata analysis apparatus 200. The list of the analysis functions is a list of available analysis functions of the bigdata analysis apparatus 200 and includes, for example, available analysis functions provided by analysis software of the bigdata analysis apparatus 200.

In response to the request, the bigdata analysis supporting apparatus 100 generates a workflow for the bigdata analysis method that is operable or available in the bigdata analysis apparatus 200 based on the analysis resource information transmitted from the bigdata analysis apparatus 200. The workflow refers to a data processing process, for example, a data processing step of analysis functions that are interconnected to one another.

The bigdata analysis supporting apparatus 100 outputs the generated workflow for the bigdata analysis method to the bigdata analysis apparatus 200.

As illustrated in FIG. 1, the bigdata analysis supporting apparatus 100 may be connected to the bigdata analysis apparatuses 300 through a network. The bigdata analysis apparatuses 300 refer to a system located outside that is connected to the bigdata analysis supporting apparatus 100 through the network. In addition, the bigdata analysis supporting apparatus 100 may be embodied by a third system separate from the bigdata analysis apparatus 200, or embodied by a physically integral form together with the bigdata analysis apparatus 200.

Figure 3:
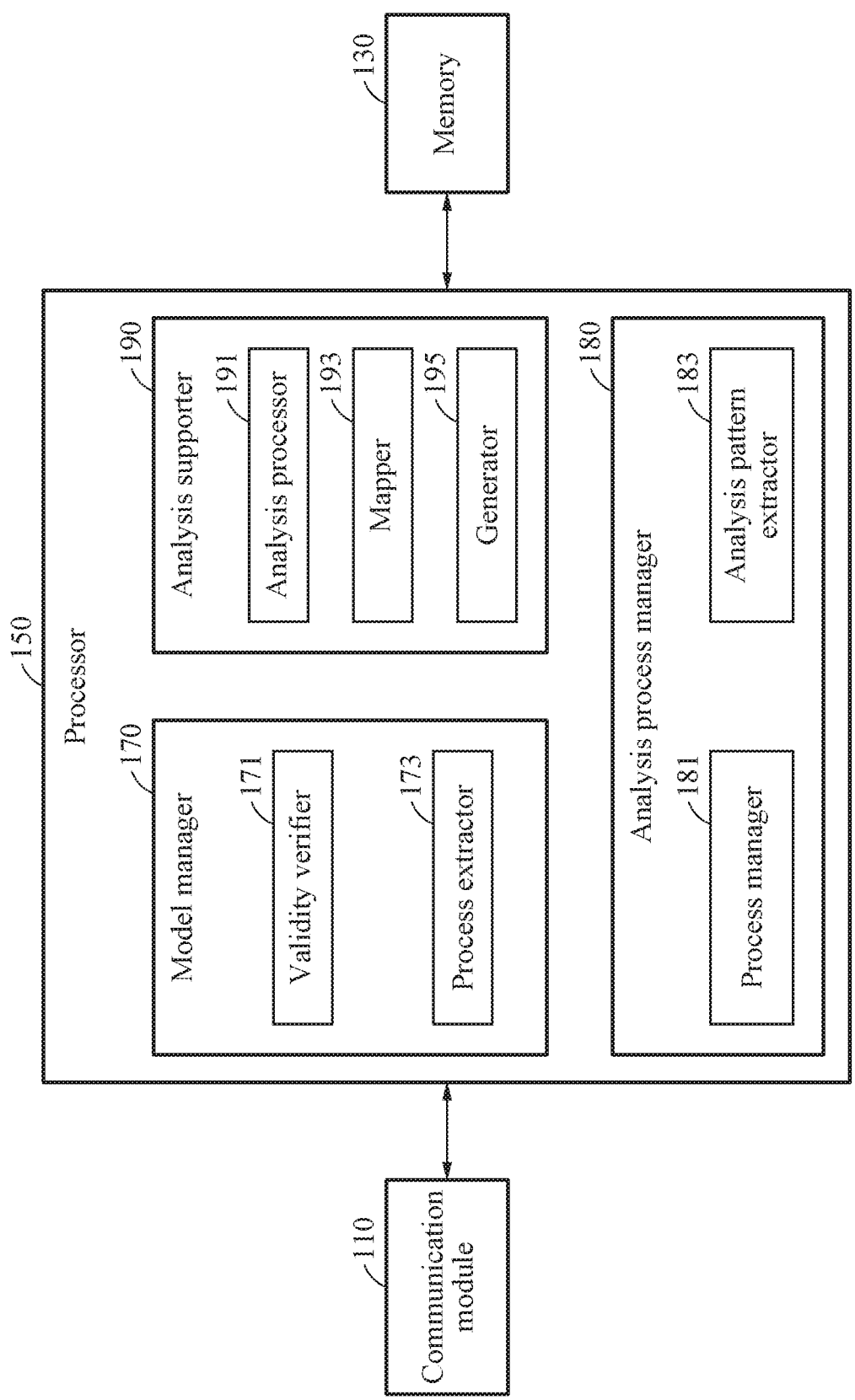
FIG. 3 is a diagram illustrating an example of a bigdata analysis supporting apparatus illustrated in FIG. 2.

FIG. 3 is a diagram illustrating the bigdata analysis supporting apparatus 100 illustrated in FIG. 2.

Referring to FIG. 3, the bigdata analysis supporting apparatus 100 includes a communication module 110, a memory 130, and a processor 150.

The bigdata analysis supporting apparatus 100 receives and transmits a signal from and to the bigdata analysis apparatuses 200 and 300 through the communication module 110. The communication module 110 receives, from the bigdata analysis apparatus 200, a request to provide a bigdata analysis method and analysis resource information, and transmits the received request and the received analysis resource information to the processor 150. In addition, the communication module 110 receives sets of provenance information from the bigdata analysis apparatuses 300, and transmits the received provenance information to the processor 150.

The memory 130 stores instructions or programs that are executable by the processor 150. For example, the instructions are used to perform at least one operation to generate a workflow for the bigdata analysis method that is operable in or available for the bigdata analysis apparatus 200.

The processor 150 controls an overall operation of the bigdata analysis supporting apparatus 100. The processor 150 may be embodied as at least one processor including at least one core.

The processor 150 executes the instructions to generate the workflow corresponding to the bigdata analysis method. The instructions may be embodied by or embedded in the processor 150. The processor 150 writes or records at least one result from the execution in the memory 130 or another memory (not shown), for example, an internal register, an internal cache, or a storage.

The processor 150 performs operations needed to generate the workflow corresponding to the bigdata analysis method. The workflow corresponding to the bigdata analysis method may be configurable or operable in the bigdata analysis apparatus 200. The processor 150 includes a model manager 170, an analysis process manager 180, and an analysis supporter 190.

The model manager 170 extracts, from the sets of provenance information, workflows respectively corresponding to the sets of provenance information. The model manager 170 includes a validity verifier 171 and a process extractor 173.

The validity verifier 171 verifies validity of each of the sets of provenance information. Here, such validity verification is to verify whether provenance information satisfies a condition for generating an original workflow. The original workflow refers to a data processing process of a bigdata analysis apparatus that generates corresponding provenance information.

For example, the validity verifier 171 generates sets of transformed provenance information by transforming, or decoding, the sets of provenance information by a common provenance model. The validity verifier 171 determines whether each of the sets of transformed provenance information includes data instance information, function information, and computational environment information, and determines whether each of the sets of transformed provenance information satisfies the condition for generating the original workflow. When at least one of the data instance information, the function information, or the computational environment information is not included in the transformed provenance information, the validity verifier 171 determines that the transformed provenance information does not satisfy the condition for generating the original workflow.

Here, sets of provenance information for which validity is verified by the validity verifier 171 may be reusable. The validity verifier 171 outputs, to the process extractor 173, the sets of provenance information with the verified validity.

The processor extractor 173 extracts, from the sets of provenance information with the verified validity, workflows respectively corresponding to the sets of provenance information with the verified validity, and outputs the extracted workflows to the analysis process manager 180.

The analysis process manager 180 manages the workflows extracted by the process extractor 173. The analysis process manger 180 includes a process manager 181 and an analysis pattern extractor 183.

The process manager 181 collects and stores the workflows. The process manager 181 applies a frequency of an analysis function included in or used for each of the workflows and generates an analysis process graph model, or an analysis process graph, corresponding to each of the workflows, and stores the generated analysis process graph model.

At a request of the analysis supporter 190, the process manager 181 retrieves workflows from analysis process graph models, and returns the retrieved workflows. The retrieved workflows may be workflows corresponding to the bigdata analysis method that satisfy the analysis resource information and are operable in the bigdata analysis apparatus 200.

The analysis pattern extractor 183 extracts a frequent pattern of a process step that occurs frequently in the workflows, and stores the extracted frequent pattern. To this end, the analysis pattern extractor 183 provides a function of retrieving the frequent pattern from the analysis process graph model.

The analysis supporter 190 reconfigures, to be supported by the bigdata analysis apparatus 200, a workflow selected by the bigdata analysis apparatus 200 from the plurality of workflows corresponding to the bigdata analysis method that satisfies the analysis resource information, and provides the reconfigured workflow to the bigdata analysis apparatus 200. The analysis supporter 190 includes an analysis processor 191, a mapper 193, and a generator 195.

The analysis processor 191 transmits, to the analysis process manager 180, a request for or a query about at least one workflow corresponding to the bigdata analysis method or a frequent analysis pattern based on the analysis resource information. The at least one workflow may be operable in the bigdata analysis apparatus 200. The request may include a variable value of a frequency of use of an analysis function and a frequency of occurrence of each analysis function.

The mapper 193 performs mapping on functions. The mapper 193 performs the mapping based preferentially on a name of a function to map functions performing a same operation or functionality in different systems. In addition, the mapper 193 extracts a group of candidates for an alternative function having a mapping relationship by calculating a vector value based on a format and a structure of input data to be used for a function, a form of output data, a frequency (fc) of use of each function, and a frequency (lc) of occurrence of related functions. The alternative function may be a combination of at least one function. The mapper 193 stores and manages alternative function information associated with functions performing a same operation or functionality.

The mapper 193 transforms analysis functions included in the workflow selected by the bigdata analysis apparatus 200 into available analysis functions of the bigdata analysis apparatus 200 by mapping the analysis functions included in the workflow selected by the bigdata analysis apparatus 200 to a list of the available analysis functions of the bigdata analysis apparatus 200.

The generator 195 reconfigures the selected workflow to be a workflow supported by the bigdata analysis apparatus 200 using the mapped available analysis functions. The generator 195 outputs the reconfigured workflow to the bigdata analysis apparatus 200.

Figure 4:
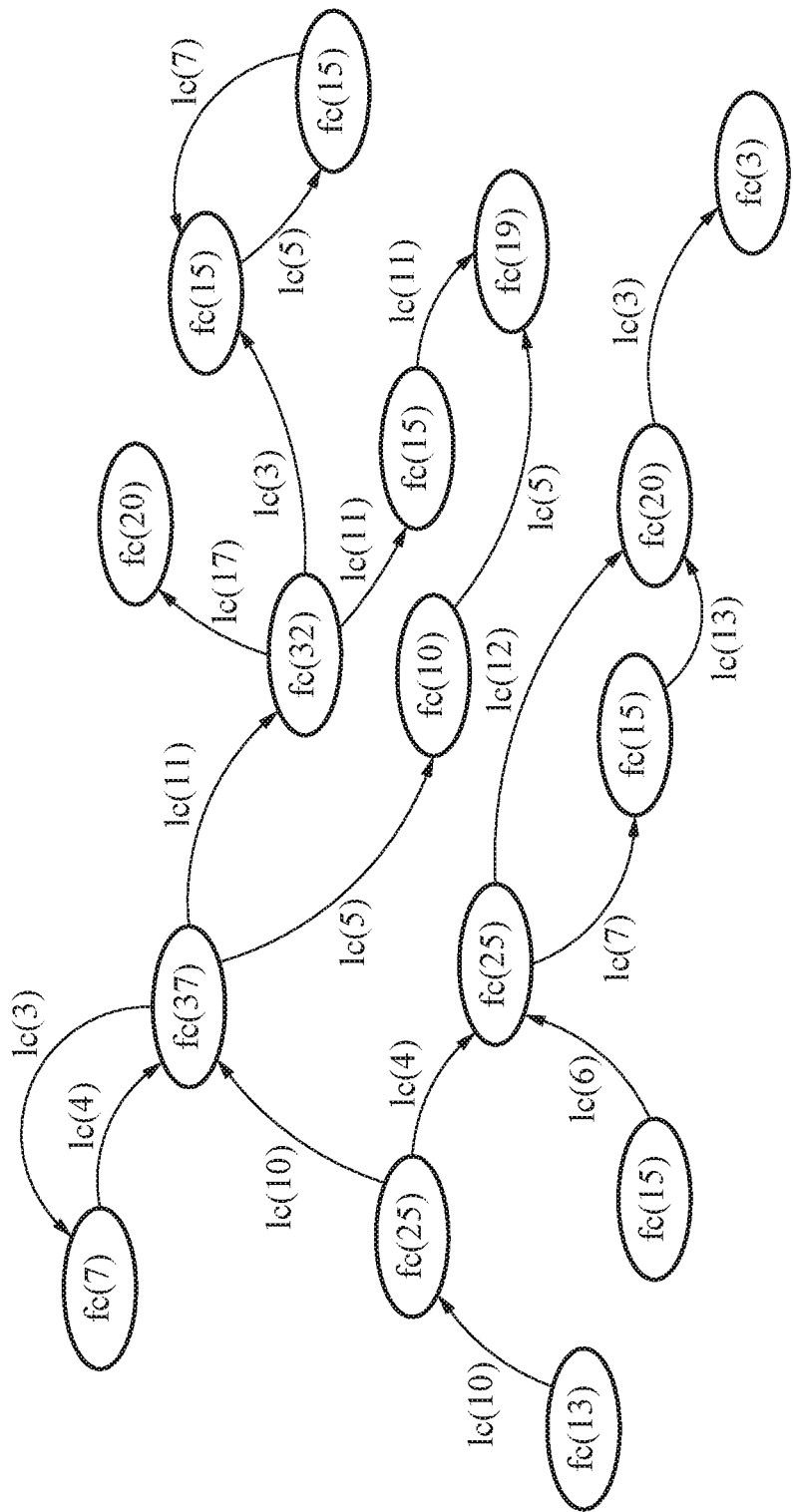
FIG. 4 is a diagram illustrating an example of an analysis process graph model to be generated by a process manager according to an example embodiment.

FIG. 4 is a diagram illustrating an example of an analysis process graph model to be generated by the process manager 181.

Referring to FIG. 4, an analysis process graph model includes at least one workflow, and a frequency of each analysis function included in the at least one workflow. The analysis process graph model may include a plurality of workflows.

A frequency of an analysis function includes a frequency of use of the analysis function, and a frequency of sequential occurrence of the analysis function and a neighboring analysis function of the analysis function. The frequency of use of each analysis function is indicated by "fc," and the frequency of sequential occurrence between two analysis functions is indicated by "lc."

At a request of the analysis supporter 190, the process manager 181 retrieves a workflow from analysis process graph models based on a frequency of use of an analysis function, and a frequency of occurrence of neighboring analysis functions. The request of the analysis supporter 190 includes a variable value of the frequency of use of an analysis function and a variable value of the frequency of occurrence among analysis functions.

Figure 5:
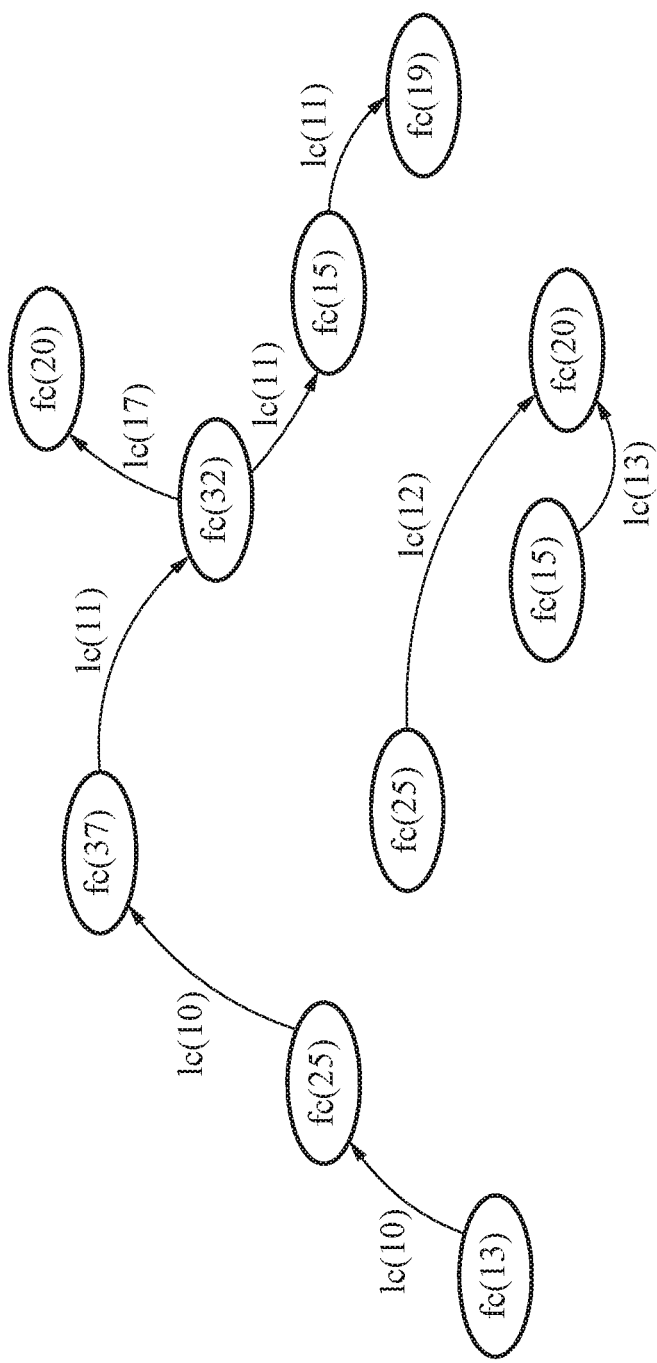
FIG. 5 is a diagram illustrating an example of extracting a frequent pattern by an analysis pattern extractor according to an example embodiment.

FIG. 5 is a diagram illustrating an example of extracting a frequent pattern by the analysis pattern extractor 183.

FIG. 5 illustrates an example of how a frequent pattern is extracted from the analysis process graph model illustrated in FIG. 4. The analysis pattern extractor 183 extracts a frequent pattern from the analysis process graph model based on a variable value of frequency, and stores the extracted frequent pattern. The variable value of frequency includes a variable value of a frequency of use and a variable value of a frequency of occurrence. In addition, the variable value of frequency may be a variable value that is input by a user or defined in advance, for example, fc and lc. The example of FIG. 5 illustrates a result from the extraction in the example of FIG. 4, in a case in which an input variable value is (10, 10).

Figure 6:
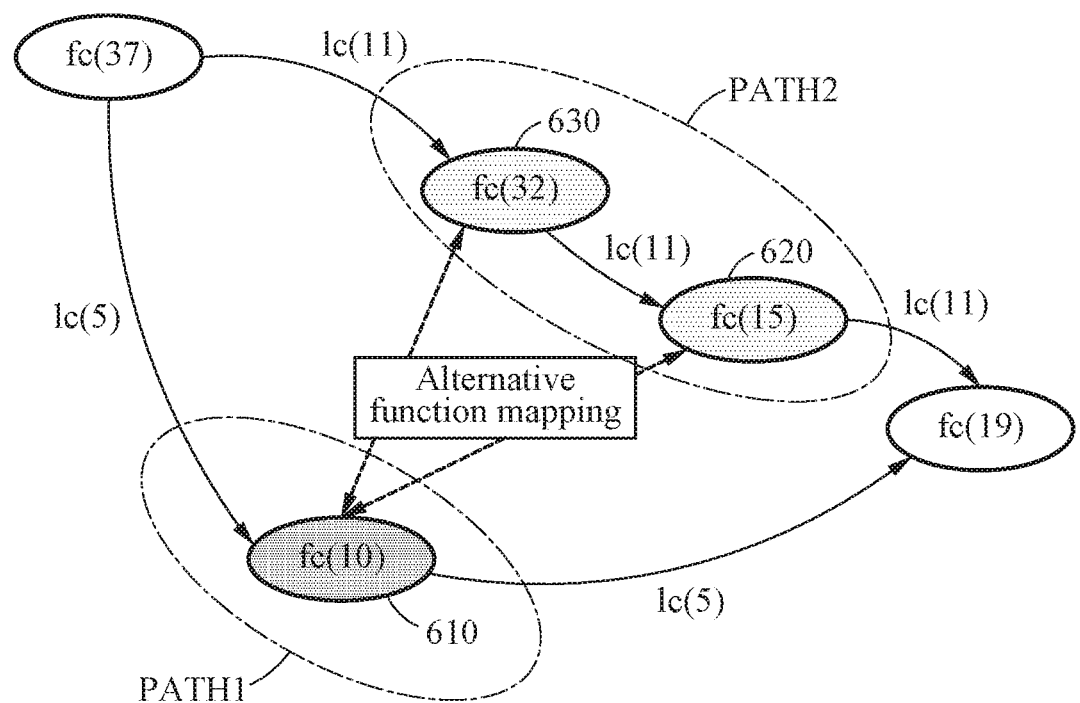
FIG. 6 is a diagram illustrating an example of extracting an alternative function candidate using an analysis process graph model by a mapper according to an example embodiment.

FIG. 6 is a diagram illustrating an example of extracting an alternative function candidate using an analysis process graph model by the mapper 193.

Referring to FIG. 6, when one-to-one function mapping is not available, the mapper 193 identifies a replaceable process or path through an analysis process graph model, and uses the identified replaceable process or path. The mapper 193 extracts at least one function corresponding to the replaceable process or path as an alternative function candidate.

For example, as illustrated, when an analysis function 610 corresponding to a first path, for example, PATH 1, in a workflow, is not available for one-to-one mapping, the mapper 193 identifies a second path, for example, PATH 2, in the workflow as a path that may replace the first path. The mapper 193 extracts analysis functions 620 and 630 corresponding to the second path as alternative function candidates for the analysis function 610.

Figure 7:
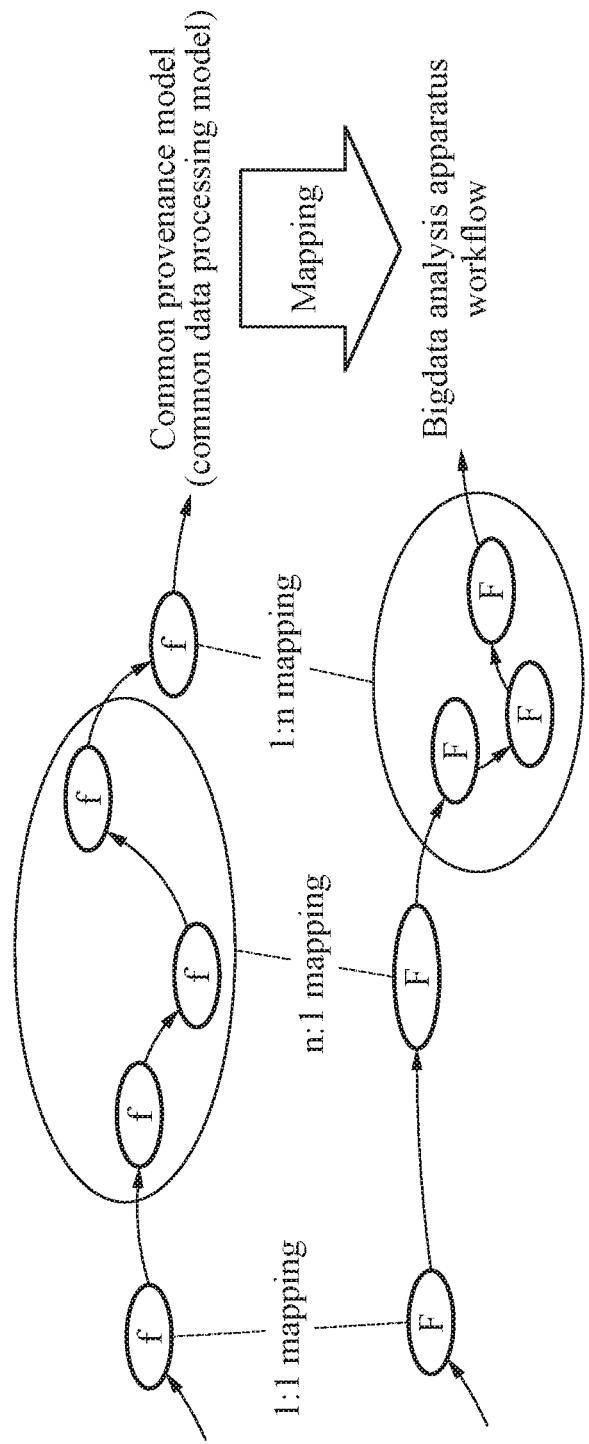
FIG. 7 is a diagram illustrating an example of mapping a function by a mapper to generate a workflow according to an example embodiment.

FIG. 7 is a diagram illustrating an example of mapping a function by the mapper 193 to generate a workflow.

Referring to FIG. 7, the mapper 193 performs mapping between analysis functions included in a workflow of a common provenance model, and a list of available analysis functions of the bigdata analysis apparatus 200, in order to reconfigure a common model-based workflow to be supported by the bigdata analysis apparatus 200. The common model-based workflow may include analysis functions based on a common model. For example, the common model may be the common provenance model.

The mapper 193 fundamentally performs a one-to-one function transformation. In a case of a function on which the one-to-one function transformation is not available to be performed, the mapper 193 may replace one of an analysis function included in a selected workflow and an available analysis function by a combination of functions performing a same operation, or by a single function performing the same operation as that of the functions, to perform the mapping. That is, the mapper 193 performs the mapping using alternative function information associated with alternative functions performing the same operation.

For example, as illustrated, the mapper 193 maps a combination of analysis functions included in the selected workflow and a single available analysis function of the bigdata analysis apparatus 200, or maps a single analysis function included in the selected workflow and a combination of available analysis functions of the bigdata analysis apparatus 200. The mapper 193 may also perform the mapping in an opposite way.

Figure 8:
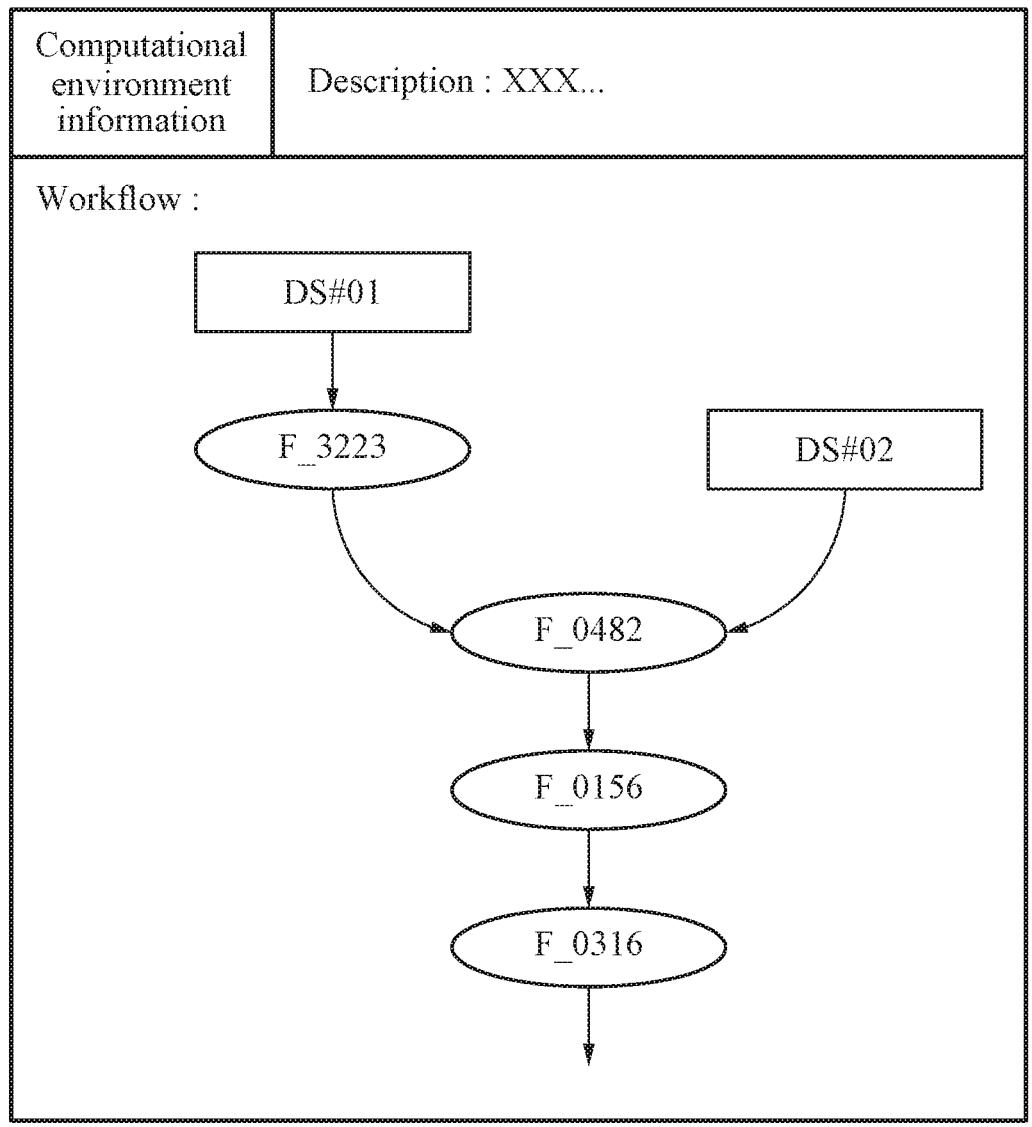
FIG. 8 is a diagram illustrating an example of a workflow reconfigured by a generator to be output to a bigdata analysis apparatus according to an example embodiment.

FIG. 8 is a diagram illustrating an example of a workflow reconfigured by the generator 195 to be output to a bigdata analysis apparatus.

Referring to FIG. 8, the generator 195 reconfigures a selected workflow to be supported by the bigdata analysis apparatus 200 using available analysis functions mapped by the mapper 193. The generator 195 outputs the reconfigured workflow to the bigdata analysis apparatus 200.

The reconfigured workflow may include computational environment information, information associated with data, for example, DS #01 and DS #02, that is included in analysis resource information, and a mapped data processing process that is mapped by an available analysis function of the bigdata analysis apparatus 200.

Figure 9:
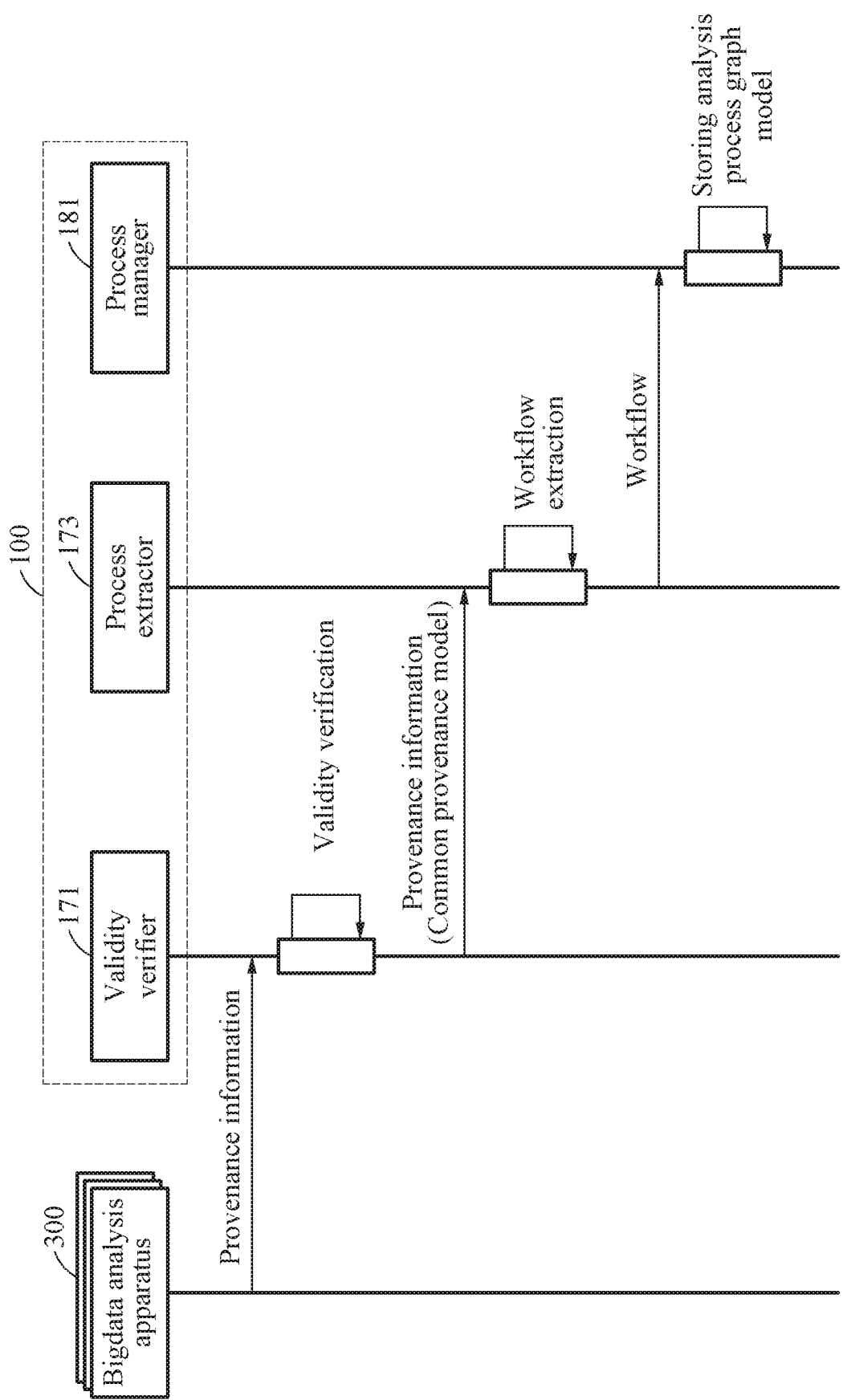
FIG. 9 is a data flow illustrating an example of collecting and storing provenance information according to an example embodiment.

FIG. 9 is a data flow illustrating an example of collecting and storing provenance information according to an example embodiment.

Referring to FIG. 9, each of the bigdata analysis apparatuses 300 transmits provenance information to the bigdata analysis supporting apparatus 100.

The validity verifier 171 transforms, for example, decodes, the received sets of provenance information by a common provenance model to generate transformed sets of provenance information. The validity verifier 171 verifies whether each of the transformed sets of provenance information includes data instance information, function information, and computational environment information, and determines whether each of the transformed sets of provenance information satisfies a condition for generating an original workflow. The validity verifier 171 outputs, to the process extractor 173, sets of provenance information that satisfy validity.

The process extractor 173 extracts workflows from the sets of provenance information, and outputs the extracted workflows to the process manager 181.

The process manager 181 applies a frequency of an analysis function included in or used for each of the workflows to generate an analytic process graph model or an analysis process graph corresponding to each workflow, and stores the generated analysis process graph model.

Figure 10:
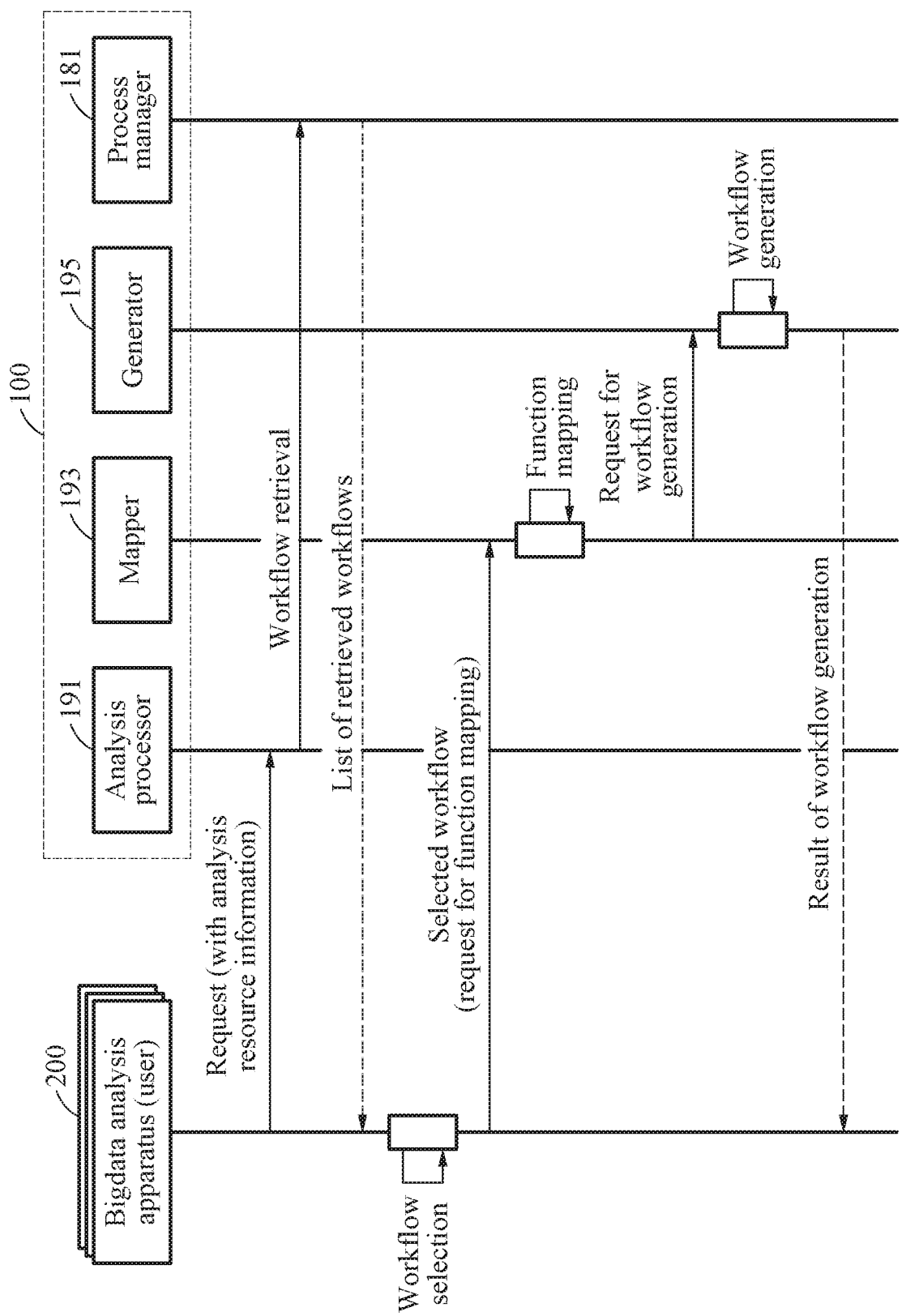
FIG. 10 is a data flow illustrating an example of generating a workflow for a bigdata analysis apparatus according to an example embodiment.

FIG. 10 is a data flow illustrating an example of generating a workflow for a bigdata analysis apparatus according to an example embodiment.

Referring to FIG. 10, the bigdata analysis apparatus 200 transmits, to the bigdata analysis supporting apparatus 100, a request for a workflow corresponding to a bigdata analysis method that is operable in the bigdata analysis apparatus 200. Here, analysis resource information may also be transmitted along with the request, or by being included in the request.

The analysis processor 191 transmits, to the process manager 181, a request for a list of workflows corresponding to the bigdata analysis method based on the analysis resource information.

In response to the request, the process manager 181 retrieves workflows from analysis process graph models, and outputs a list of the retrieved workflows to the bigdata analysis apparatus 200. The retrieved workflows may be workflows that satisfy the analysis resource information and correspond to the bigdata analysis method, and are operable in the bigdata analysis apparatus 200.

The bigdata analysis apparatus 200 selects a workflow to be used from the list of the retrieved workflows in response to an input from a user. The bigdata analysis apparatus 200 transmits a request for the selected workflow to the bigdata analysis supporting apparatus 100.

The mapper 193 transforms analysis functions included in the workflow selected by the bigdata analysis apparatus 200 into available analysis functions of the bigdata analysis apparatus 200 through mapping between the analysis functions included in the selected workflow and a list of the available analysis functions of the bigdata analysis apparatus 200.

The generator 195 reconfigures the selected workflow to be a workflow supported by the bigdata analysis apparatus 200 using the mapped available analysis functions. The generator 195 outputs the reconfigured workflow to the bigdata analysis apparatus 200.

Figure 11:
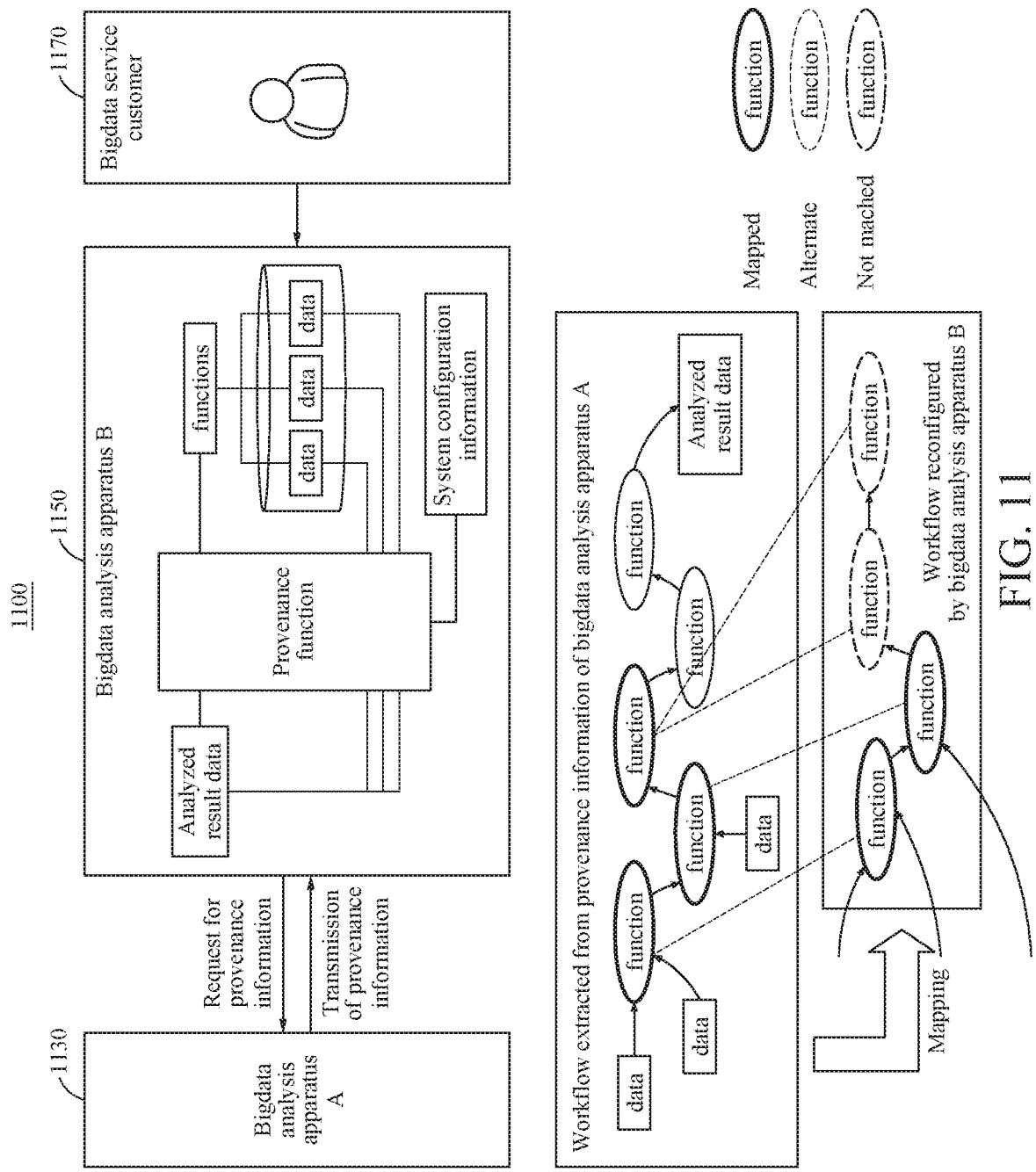
FIG. 11 is a data flow illustrating another example of a service provided by the bigdata service system illustrated in FIG. 2.

FIG. 11 is a data flow illustrating another example of a service provided by a bigdata service system according to an example embodiment.

Referring to FIG. 11, a bigdata service system 1100 includes a plurality of bigdata analysis apparatuses 1130 and 1150. The bigdata analysis apparatuses 1130 and 1150 include a bigdata analysis apparatus A 1130 and a bigdata analysis apparatus B 1150. The bigdata analysis apparatus B 1150 may be a bigdata analysis apparatus into which the bigdata analysis supporting apparatus 100 described above with reference to FIGS. 1 through 10 is physically integrated. That is, the bigdata analysis apparatus B 1150 may perform operations of the bigdata analysis supporting apparatus 100 described above with reference to FIGS. 1 through 10.

A bigdata service customer 1170 may be a user of the bigdata analysis apparatus B 1150, and the user may be a data analyst. The bigdata service customer 1170 may perform an experiment with its data using provenance information received from the bigdata analysis apparatus A 1130. Here, the bigdata analysis apparatus B 1150 may extract a workflow for a data analysis process from the provenance information of the bigdata analysis apparatus A 1130, and reconfigure the extracted workflow to be suitable for an analysis environment of the bigdata analysis apparatus B 1150 using an analysis function provided by the bigdata analysis apparatus B 1150. The bigdata service customer 1170 may perform the experiment with the data using the workflow reconfigured by the bigdata analysis apparatus B 1150.

The bigdata service customer 1170 may transmit a request for provenance information to the bigdata analysis apparatus B 1150. In response to the request of the bigdata service customer 1170, the bigdata analysis apparatus B 1150 may transmit the request for the provenance information to the bigdata analysis apparatus A 1130 which is a different analysis system.

The bigdata analysis apparatus B 1150 may receive the provenance information transmitted from the bigdata analysis apparatus A 1130, and decode the received provenance information.

The bigdata analysis apparatus B 1150 may extract a workflow from the decoded provenance information.

The bigdata analysis apparatus B 1150 may verify adaptability of the workflow and reconfigure, or transform, the workflow to be usable in the bigdata analysis apparatus B 1150. For example, the bigdata analysis apparatus B 1150 may verify adaptability of a computational environment of the bigdata analysis apparatus A 1130. The bigdata analysis apparatus B 1150 may then map an analysis function included in the workflow and an analysis function supported by the bigdata analysis apparatus B 1150. When the functions are not accurately mapped, the bigdata analysis apparatus B 1150 may verify or retrieve an alternative function, and replace the function that is not mapped by the alternative function. Here, the bigdata service customer 1170 may select the alternative function from a list of alternative functions.

The bigdata service customer 1170 may apply, to the data, the workflow reconfigured by the bigdata analysis apparatus B 1150.

As described above, according to example embodiments, it is possible to reconfigure data processing processes used by different systems to be a data analysis process supported by a system based on sets of data provenance information present inside and/or outside the system. The reconfigured data analysis process may be used to perform a bigdata analysis and verify reliability of data. In addition, it is possible to generate an analysis process that is supported by a system and optimize the analysis process, thereby reducing an amount of time used for an analysis and reducing system resources.

The units described herein may be implemented using hardware components and software components. For example, the hardware components may include microphones, amplifiers, band-pass filters, audio to digital convertors, non-transitory computer memory and processing devices. A processing device may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums. The non-transitory computer readable recording medium may include any data storage device that can store data which can be thereafter read by a computer system or processing device.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A bigdata analysis supporting method, comprising:
receiving, from a bigdata analysis apparatus, a request to provide a bigdata analysis method;
reconfiguring, to be supported by the bigdata analysis apparatus, a workflow selected from a plurality of workflows corresponding to the bigdata analysis method based on analysis resource information of the bigdata analysis apparatus; and
transmitting the reconfigured workflow to the bigdata analysis apparatus,
wherein the reconfiguring comprises:
retrieving the plurality of workflows corresponding to the bigdata analysis method based on the analysis resource information,
wherein the analysis resource information includes system configuration information of the bigdata analysis apparatus, a list of available analysis functions of the bigdata analysis apparatus, and information associated with data to be used for a bigdata analysis,
wherein the plurality of workflows is operable in the bigdata analysis apparatus, and
wherein the workflow refers to a data processing step of analysis functions that are interconnected to one another.

2. The bigdata analysis supporting method of claim 1, wherein the retrieving comprises:
retrieving the plurality of workflows satisfying the analysis resource information from a plurality of analysis process graph models.

3. The bigdata analysis supporting method of claim 1, wherein the reconfiguring comprises:
transforming, into available analysis functions of the bigdata analysis apparatus, analysis functions included in the selected workflow by mapping the analysis functions and a list of the available analysis functions of the bigdata analysis apparatus.

4. The bigdata analysis supporting method of claim 3, wherein the reconfiguring comprises:
reconfiguring the selected workflow to be supported by the bigdata analysis apparatus using the mapped available analysis functions.

5. The bigdata analysis supporting method of claim 3, wherein the transforming comprises:
mapping the analysis functions included in the selected workflow respectively to the available analysis functions of the bigdata analysis apparatus;
mapping a combination of the analysis functions included in the selected workflow to a single available analysis function of the bigdata analysis apparatus; and
mapping a single analysis function included in the selected workflow to a combination of the available analysis functions of the bigdata analysis apparatus.

6. The bigdata analysis supporting method of claim 2, wherein the plurality of analysis process graph models is generated by applying a frequency of an analysis function to workflows extracted from sets of provenance information of bigdata analysis apparatuses.

7. The bigdata analysis supporting method of claim 6, wherein the frequency of the analysis function includes a frequency of use of the analysis function and a frequency of sequential occurrence of the analysis function and a neighboring analysis function of the analysis function.

8. A bigdata analysis supporting apparatus, comprising:
a communication module configured to receive, from a bigdata analysis apparatus, a request to provide a bigdata analysis method; and
a processor configured to execute instructions to generate a workflow for the bigdata analysis method,
wherein, when the instructions are executed, the processor is configured to:
reconfigure, to be supported by the bigdata analysis apparatus, a workflow selected from a plurality of workflows corresponding to the bigdata analysis method based on analysis resource information of the bigdata analysis apparatus; and
transmit the reconfigured workflow to the bigdata analysis apparatus,
wherein the processor is configured to retrieve the plurality of workflows corresponding to the bigdata analysis method based on the analysis resource information,
wherein the analysis resource information includes system configuration information of the bigdata analysis apparatus, a list of available analysis functions of the bigdata analysis apparatus, and information associated with data to be used for a bigdata analysis,
wherein the plurality of workflows is operable in the bigdata analysis apparatus, and
wherein the workflow refers to a data processing step of analysis functions that are interconnected to one another.

9. The bigdata analysis supporting apparatus of claim 8, wherein the processor is configured to retrieve, from a plurality of analysis process graph models, the plurality of workflows satisfying the analysis resource information.

10. The bigdata analysis supporting apparatus of claim 8, wherein the processor is configured to transform, into available analysis functions of the bigdata analysis apparatus, analysis functions included in the selected workflow by mapping the analysis functions to a list of the available analysis functions of the bigdata analysis apparatus.

11. The bigdata analysis supporting apparatus of claim 10, wherein the processor is configured to reconfigure the selected workflow to be supported by the bigdata analysis apparatus using the mapped available analysis functions.

12. The bigdata analysis supporting apparatus of claim 10, wherein the processor is configured to:
map the analysis functions included in the selected workflow respectively to the available analysis functions of the bigdata analysis apparatus;
map a combination of the analysis functions included in the selected workflow to a single available analysis function of the bigdata analysis apparatus; and
map a single analysis function included in the selected workflow to a combination of the available analysis functions of the bigdata analysis apparatus.

13. The bigdata analysis supporting apparatus of claim 9, wherein the plurality of analysis process graph models is generated by applying a frequency of an analysis function to workflows extracted from sets of provenance information of bigdata analysis apparatuses.

14. The bigdata analysis supporting apparatus of claim 13, wherein the frequency of the analysis function includes a frequency of use of the analysis function, and a frequency of sequential occurrence of the analysis function and a neighboring analysis function of the analysis function.

\* \* \* \* \*